United States Patent
Wolgast

(10) Patent No.: US 10,850,851 B2
(45) Date of Patent: Dec. 1, 2020

(54) SEAT ARRANGEMENT FOR A CABIN OF A VEHICLE AS WELL AS A VEHICLE HAVING SUCH A SEAT ARRANGEMENT IN A CABIN

(71) Applicant: Airbus Operations GmbH, Hamburg (DE)

(72) Inventor: Carsten Wolgast, Hamburg (DE)

(73) Assignee: Airbus Operations GmbH

( * ) Notice: Subject to any disclaimer, the term of this patent is extended or adjusted under 35 U.S.C. 154(b) by 238 days.

(21) Appl. No.: 15/609,071

(22) Filed: May 31, 2017

(65) Prior Publication Data
US 2017/0341755 A1 Nov. 30, 2017

(30) Foreign Application Priority Data
May 31, 2016 (DE) .................. 10 2016 110 000

(51) Int. Cl.
*B64D 11/06* (2006.01)

(52) U.S. Cl.
CPC ...... *B64D 11/0696* (2013.01); *B64D 11/0601* (2014.12); *B64D 11/064* (2014.12)

(58) Field of Classification Search
CPC .............. B64D 11/064; B64D 11/0696; B60N 2/01583; B60N 2/01; B60N 2/0155; B60N 2/0727; B60N 2/0825; B60N 2/0868
See application file for complete search history.

(56) References Cited

U.S. PATENT DOCUMENTS

| 3,142,461 | A * | 7/1964 | Tomlinson ......... B64D 11/0696 244/137.1 |
| 3,381,927 | A * | 5/1968 | Stamates ................ B60N 2/071 248/429 |
| 4,936,527 | A | 6/1990 | Gorges |
| 6,260,813 | B1 * | 7/2001 | Whitcomb ......... B64D 11/0696 244/118.6 |
| 6,264,159 | B1 * | 7/2001 | Su ........................ B60N 2/0705 248/430 |
| 6,561,458 | B1 | 5/2003 | Lowery |

(Continued)

FOREIGN PATENT DOCUMENTS

| DE | 103 07 870 A1 | 9/2004 |
| DE | 10 2007 063 565 A1 | 6/2009 |

(Continued)

*Primary Examiner* — Christopher D Hutchens
(74) *Attorney, Agent, or Firm* — Lerner, David, Littenberg, Krumholz & Mentlik, LLP

(57) ABSTRACT

A vehicle cabin seat arrangement includes a seat rail having a first and a second side faces; a group of passenger seats held on the seat rail by holding devices resting on a top side of the seat rail; pluralities of first and second holding blocks arranged on the first and second side faces, respectively; and a plurality of stop blocks arranged on a bottom side of a holding device To every passenger seat two first or second holding blocks are assigned, between which a holding device coupled with the passenger seat is displaceable. The respective holding device, includes one of the stop blocks arranged on the bottom side of the holding device such that the stop block is bringable into contact with the two assigned holding blocks on moving the holding device on the seat rail. Passenger seats are alternatingly assigned with first and second holding blocks.

15 Claims, 2 Drawing Sheets

(56) References Cited

U.S. PATENT DOCUMENTS

| | | |
|---|---|---|
| 6,659,402 B1 | 12/2003 | Prochaska |
| 7,083,146 B2 | 8/2006 | Hiesener |
| 7,448,822 B2 | 11/2008 | Nebeker et al. |
| 7,607,736 B2 | 10/2009 | Ponzo De Siqueira |
| 7,857,259 B2 | 12/2010 | Baatz et al. |
| 7,857,561 B2 | 12/2010 | Mejuhas et al. |
| 8,033,501 B2 | 10/2011 | Callahan et al. |
| 8,074,954 B2 | 12/2011 | Wilhelm et al. |
| 8,910,907 B2 | 12/2014 | Gonnsen et al. |
| 8,944,378 B2 | 2/2015 | Bishop et al. |
| 9,656,753 B2 | 5/2017 | Schomacker et al. |
| 9,713,969 B2 | 7/2017 | Schomacker et al. |
| 2006/0097109 A1* | 5/2006 | Laib .................. B64D 11/0696 244/118.6 |
| 2010/0038483 A1 | 2/2010 | Yamasaki |
| 2013/0257121 A1* | 10/2013 | Otta ....................... B60N 2/005 297/217.1 |
| 2014/0077577 A1* | 3/2014 | Gensch ............. B64D 11/0696 297/463.1 |
| 2015/0202992 A1* | 7/2015 | Cailleteau .............. B60N 2/015 297/248 |
| 2017/0259925 A1* | 9/2017 | Olulana .................... B64C 1/20 |
| 2019/0047443 A1* | 2/2019 | Gross ................ B60N 2/01516 |

FOREIGN PATENT DOCUMENTS

| | | |
|---|---|---|
| DE | 102008006947 A1 | 8/2009 |
| DE | 10 2009 004 987 A1 | 7/2010 |
| DE | 10 2012 012 686 A1 | 1/2014 |
| DE | 10 2013 103 667 A1 | 10/2014 |

\* cited by examiner

SEAT ARRANGEMENT FOR A CABIN OF A VEHICLE AS WELL AS A VEHICLE HAVING SUCH A SEAT ARRANGEMENT IN A CABIN

FIELD OF THE INVENTION

The invention relates to a seat arrangement for a cabin of a vehicle as well as a vehicle having such a seat arrangement in a cabin.

BACKGROUND OF THE INVENTION

In interior spaces of passenger transport vehicles, passenger seats and installations are often fastened on rails, which are arranged in or at a floor. Such rails usually comprise arresting means arranged in a raster, which allow a flexible fastening of the respective installations at a desired location. It is further known to change a seating density in a cabin of a vehicle through enlarging or reducing the distance between two seat rows following each other in a longitudinal direction. This distance is known as "seat distance" or "seat pitch". Since usually a plurality of seat rows with a plurality of passenger seats arranged abreast is distributed in the cabin, the individual seat distances need to be maintained precisely, such that the desired passenger comfort as well as the desired utilization of the cabin are achieved.

The precise positioning of seat rows and other installations requires an exact acquisition of the distances between the respective installations, which is relatively complex. In particular with the rails being arranged on a floor, this requires a quite unergonomic handling of measuring devices kneeling on the floor. Particularly with larger passenger cabins, this can be very cumbersome, if cabin personnel has to conduct this process and cannot establish a routine, as the position changes are to be conducted rather seldomly.

An imprecise engagement of locking means with arresting means of the rail may furthermore lead to damaging the arresting means in the long run.

DE 10 2008 006 947 A1 shows a system for a synchronous longitudinal displacement of a plurality of selected seats or seat rows in an aircraft, at which inter alia a drive device for displacing the seats is utilizable.

BRIEF SUMMARY OF THE INVENTION

An aspect of the invention lies in proposing an improved, adaptable seating configuration by means of a rail system or another device capable for fastening of objects, at which device a manual reconfiguration in particular of seats is simplified.

A seat arrangement for a cabin of a vehicle is proposed, comprising at least one rail having a first side face and a second side face, which on both sides border a top side of the rail, at least one group of passenger seats, which are held on the rail by means of holding devices, that at least rest on the top side of the rail, a plurality of first holding blocks, which are arranged on the first side face of the rail, a plurality of second holding blocks, which are arranged on the second side face of the rail, and a plurality of stop blocks, which are arranged on a bottom side of a holding device each. To every passenger seat of the group of passenger seats two first or second holding blocks, respectively, that follow on each other on the same side face, are assigned, between which a holding device coupled with the passenger seat is displaceable. The respective holding device, which is coupled with the passenger seat, comprises one of the stop blocks, which is arranged on the bottom side of the holding device in such a manner, that it is bringable into contact with the two assigned holding blocks on moving the holding device on the rail. Passenger seats, that follow on each other, are alternatingly assigned with first and second holding blocks.

In the context of the invention, a seat rail is an elongate component, which is positionable particularly parallel to a longitudinal extension of the cabin on a floor of the cabin of the vehicle and is mechanically coupled with a structure of the vehicle. The seat rail serves for introducing forces and loads from objects fastened to it into this structure.

In the prior art, different kinds of seat rails, are known, from which however, a type of construction known as "Douglas rail" has established particularly for aircraft cabins. This comprises a substantially belt-like base, onto which two cantilevers facing each other are arranged, which enclose a flat hollow space on the base, are distanced through a gap and are penetrated by circular openings along the gap in regular distances, which evenly extend from the gap over both cantilevers. The base may comprise a stiffening profile at a bottom side facing away from the cantilevers.

If such a rail is used, d holding device, which is coupled with a passenger seat, may comprise locking elements, which have a mushroom-like shape with a shaft and a plate-like end arranged thereon, which locking elements are insertable into the hollow space of the seat rail through the openings and are movable along the shaft. A plate-like end may be clamped with a surface section of the cantilevers facing into the hollow space through exertion of a tensile force through the shaft, which surface section is arranged between the openings. A displacement of the holding device is accomplished through releasing the locking element, such that the plate-like end substantially contact-lessly remains in the hollow space and the locking element is movable along the gap in the rail. The shaft of the locking element is hereby adapted to the width of the gap of the rails.

Other embodiments are known, with which holding devices are glidably supported completely. For this, the rail comprises a gliding profile, which is correspondingly shaped with a recess on the holding device. Through using one or a plurality of undercuts, a lifting-off of the holding device from the rail may reliably be prevented and a movement of the holding device is only possible along the main extension of the rail. A locking element, which is arranged on the holding device, may be limited to a movably supported pin, which may engage into raster openings, which are open to a top side of the rail.

All of these seat rails are mechanically couplable with a cabin floor of a vehicle, which does not necessarily mean that a direct connection between the seat rail and the floor is required. In fact, also retrofit or add-on solutions may be utilized, with which a seat rail of one of the mentioned types may be arranged on a seat rail of another type or may be arranged on another structural component and mechanically coupled with the floor indirectly. For providing the features according to the invention, the seat rail comprises side faces, which are preferably not countersunk in the floor of the cabin, such that the holding blocks arranged thereon are accessible by a holding device arranged on the seat rail.

For example, the holding devices support a part of a seat frame of a passenger seat or of a passenger seat row. The relative positions of two holding devices that directly follow on each other of two seat frames that follow on each other in a longitudinal direction determine the seat distance of the respective seat rows. In this way, a first seat distance may be represented through a first position, while a second seat distance may be represented through a second position. In case the seat distances of more than two seat rows should be changed between a first seat distance and a second seat distance, a plurality of first positions and a plurality of second positions are required, which in each case are assigned to one or more holding devices of a single seat frame.

According to an embodiment of the invention, instead of utilizing required measuring devices for a cumbersome measuring of seat distances and/or relative positions, two holding blocks are assigned to each passenger seat, which holding blocks are arranged at the same side face of the seat rail for one passenger seat and are bringable into contact with a stop block at a holding device of a respective passenger seat. The holding blocks of two passenger seats that follow on each other are arranged at different side faces of the seat rail, i.e. first or second holding blocks are successively assigned to the passenger seats.

This design has a plurality of advantages. On the one hand, the displacement of holding devices on the seat rail is clearly simplified, since a user is provided with an optical or haptic feedback directly and immediately during the displacement of a holding device for enlarging or reducing of a seat distance. Furthermore, the respective holding devices cannot be moved further than allowed by the assigned holding blocks. Locking devices of the holding device are precisely insertable into predetermined raster openings or the such, such that the raster openings are prevented from wear through imprecise positioning of the locking devices. On the other hand, clearly larger displacement distances of the holding devices are allowed through the alternating arrangement on two different side faces, since one holding device is only blocked by those holding blocks, which are positioned on the assigned side face. Holding blocks, which belong to the other side face, can be skipped without further ado.

The holding blocks as well as the stop blocks may be shaped arbitrarily, as long as they allow to conduct a surface contact with each other. Particularly preferred they may be manufactured from a plastic material having a low density, as these do not experience a strong mechanical load.

In an advantageous embodiment, the seat rail is a glide rail. This juts out the cabin floor in order to be able to conduct a form-fit with recesses of holding devices. Therefore, the side faces of the glide rail also extend over the cabin floor and may easily be brought into a surface contact with stop blocks of a holding device.

Preferably, the distances between the first or second holding blocks, respectively, assigned to a passenger seat for a string of passenger seats that follow on each other are in each case successively increased about a widening distance of a seat distance. Thereby, the widening distance is to be understood as a difference between both seat distances, which may be assumed from the passenger seats. The successive increase is required for compensating a chain dimension that occurs when widening the seat distances.

The seat rail may furthermore comprise engagement devices for receiving holding blocks, which are arranged at the first and second side face. The engagement devices may comprise openings, threaded holes, raster devices, flanges, slots or other devices, which are suitable for providing removable connections with holding blocks.

As an alternative thereto, the holding blocks may also be connected to the side faces through a material connection. For this, bonding or welding connections are conceivable, with which the holding blocks are permanently connected to the respective side face.

Preferably, at least one first holding device is assigned to each passenger seat, which holding device is arranged at a forward seat leg of a seat frame and comprises an arresting device for arresting the seat frame on the seat rail. The arresting device depends on the type of the seat rail and may both comprise the previously mentioned, mushroom-like arresting elements with a plate-shaped widening at a shaft for a clamping fastening in a hollow space of the seat rail, and merely pins or the such, which are insertable into raster openings of the seat rail.

It is advantageous if at least one second holding device is assigned to each passenger seat, which second holding device is arranged at a rear seat leg of the seat frame and is free from a stop block. A displacement of second holding devices is not impaired through the holding blocks on the seat rail; the widening or the compacting of the seat arrangement is controlled exclusively through the first holding device. Hereby, larger distances between the holding blocks may be realized, since a second holding device may skip a holding block without further ado.

In an advantageous embodiment, the maximum distance between two holding blocks assigned to a passenger seat exceeds the seat distance between two passenger seats that follow on each other. Through the alternating arrangement of the holding blocks associated with a passenger seat, the displacement regions may also clearly overlap without blocking the holding device of a passenger seat before a predetermined end position.

It may be advantageous if the length of the stop block falls below the length of the respective holding device. Hereby, the available shifting distance may be larger as with a larger construction of the stop block. This may be realized just like that, since the stop block does not have to transfer permanent mechanical loads.

The at least one group may consist of twenty four passenger seats or passenger seat rows at a maximum and preferably of twelve passenger seats or passenger seat rows at a maximum. Depending on the desired seat distance widening or available installation space for a seat distance widening, a more or less large group of passenger seats may be equipped with a coherent group of holding blocks. The possible number of passenger seats or passenger seat rows, respectively, of such a group depends on the generatable space as well as the distribution of this generated space onto the individual passengers or passenger seat rows, respectively. In case of a seat distance of 28 to 36 inch, a possible compacting of a passenger seat from a length of exemplarily 22 inch to 10 inch may generate a space of 6 to 26 inch just through compacting of a seat. With a widening of one inch, easily 24 passenger seat or passenger seat rows, respectively, may be widened about a distance of one inch. With a widening of two inches, a maximum group size of 12 passenger seats or passenger seat rows may be conceivable.

Advantageously, the at least one group may consist of six passenger seats or passenger seat rows at a maximum. With a distinct compacting of a passenger seat or a passenger seat row about exemplarily 18 inch, six passenger seats or passenger seat rows may selectively be provided with an enlarged seat distance of three inch.

The seat arrangement may furthermore comprise at least one compactable passenger seat or a compactable passenger seat row. Hereby, a passenger seat may have a construction depth that is reduced about at least five inches up to twelve inches. Furthermore, the distance to a compactable passenger seat may be clearly reduced, which may lead to a providable installation space of exemplarily 15 inches up to about 20 inches or more, such that at least five seat rows are widenable about at least three inches in their seat distance in each case.

Particularly preferred, the compactable passenger seat or the compactable passenger seat row comprises a seat component, which is foldable up. Hereby, the construction depth is clearly reduced on demand.

The invention furthermore relates to a vehicle, comprising a cabin having at least one seat arrangement integrated therein as described above. The vehicle may particularly be an aircraft.

BRIEF DESCRIPTION OF THE DRAWINGS

Other characteristics, advantages and potential applications of the present invention result from the following description of the exemplary embodiments illustrated in the figures. In this respect, all described and/or graphically illustrated characteristics also form the object of the invention individually and in arbitrary combination regardless of their composition in the individual claims or their references to other claims. Furthermore, identical or similar objects are identified by the same reference symbols in the figures.

DETAILED DESCRIPTION

Figure 1:
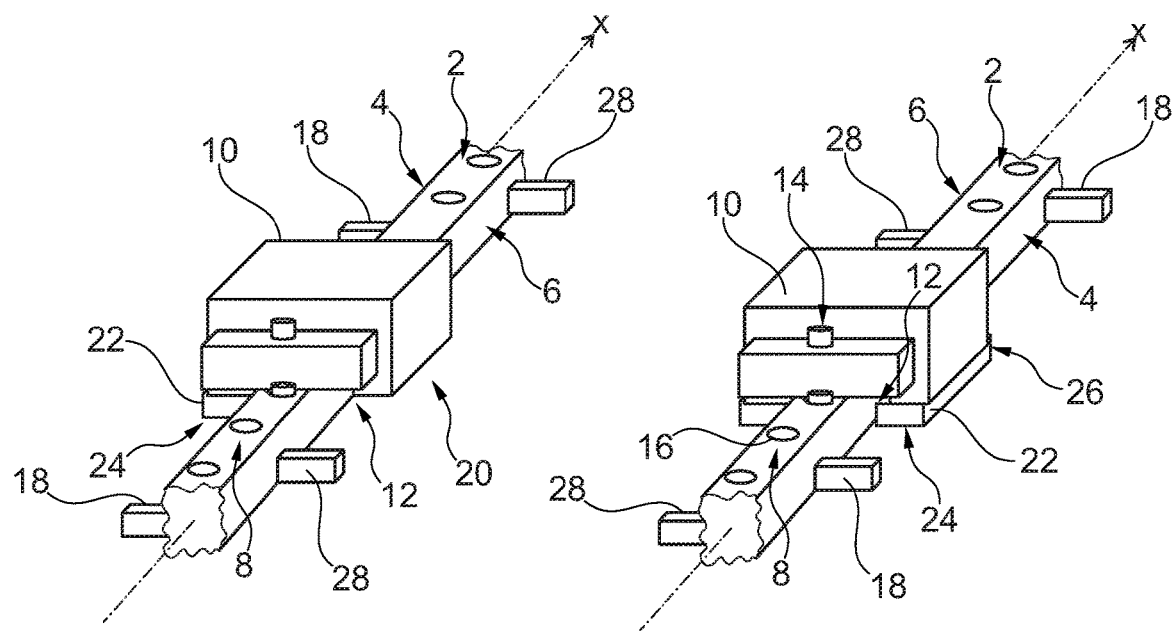
FIG. 1 shows a schematic view of two seat rails having holding blocks arranged thereon and one holding device each.

FIG. 1 shows two seat rails 2, which preferably run parallel to each other, which are arranged on a cabin floor in a cabin of a vehicle and each comprise a first side face 4 and a second side face 6, which border a top side 8 of the rail 2. Schematically, a first holding device 10 for each of the seat rails 2 is shown, which are particularly connected to a forward seat leg of a seat frame of a passenger seat (not shown).

The first holding devices 10 are adapted for a gliding displacement on the respective seat rail 2, which is realized as a glide rail. For this, a recess 12 is present, which is adapted to the cross-sectional profile of the seat rail 2.

Additionally, an arresting device 14 is provided, which comprises a pin that is movably supported perpendicularly to the seat rail 2 and exemplarily has a cylindrical shape, with which the holding device 10 may engage with raster openings 16, which end in the top side 8 of the seat rail 2, in a form-fitting manner. In combination with the recess 12, an arresting of the holding device 10 on the seat rail 2 may herewith be allowed.

For preventing the lifting-off of the holding device 10 from the seat rail 2, the seat rail 2 may comprise a profile cross-section having at least one undercut, to which a cross-sectional profile of the recess of the holding device 10 corresponds. The seat rail may consequently act as a kind of dovetail guide.

On the first side faces 4, first holding blocks 18 are arranged in a pairwise manner, which comprise a shape that protrudes from the respective side face 4, as schematically shown in this view, and which define a displacement distance for the holding device 10. The holding devices 10 each comprise a stop block 22 at a bottom side 20, which stop block comprises a first end 24 and an opposed second end 26 in the longitudinal direction of the rail 2. These ends may be brought into a surface contact with one of the first holding blocks 18, such that a further displacement into the displacement direction that initiates the respective surface contact, is not possible. In other words, the first holding block 18, upon being contacted by one of the first end 24 or the second end 26, prevents a further displacement of the stop block 22 in the displacement direction beyond the first holding block 18. Consequently, the holding device 10 is merely movable in the space defined by the two first holding blocks 18.

The goal is to conduct a seat distance widening between passenger seats that are arranged one behind each other on demand. For this, each seat has to be displaced between the holding blocks assigned thereto and to subsequently arrest it on the rail 2 again, such that their distances to each other are enlarged or reduced.

A special feature lies in the alternating use of first holding blocks 18 on the first side face 4 of the seat rail 2 and second holding blocks 28 on the second side faces 6, whose position regions may also overlap in the longitudinal direction of the respective seat rail 2. Holding devices 10 of passenger seats arranged behind each other each comprise a stop block 22 for assigning to the first holding blocks 18 or the second holding blocks 28, respectively, which either runs along the first side face 4 or along the second side face 6.

Figure 2:
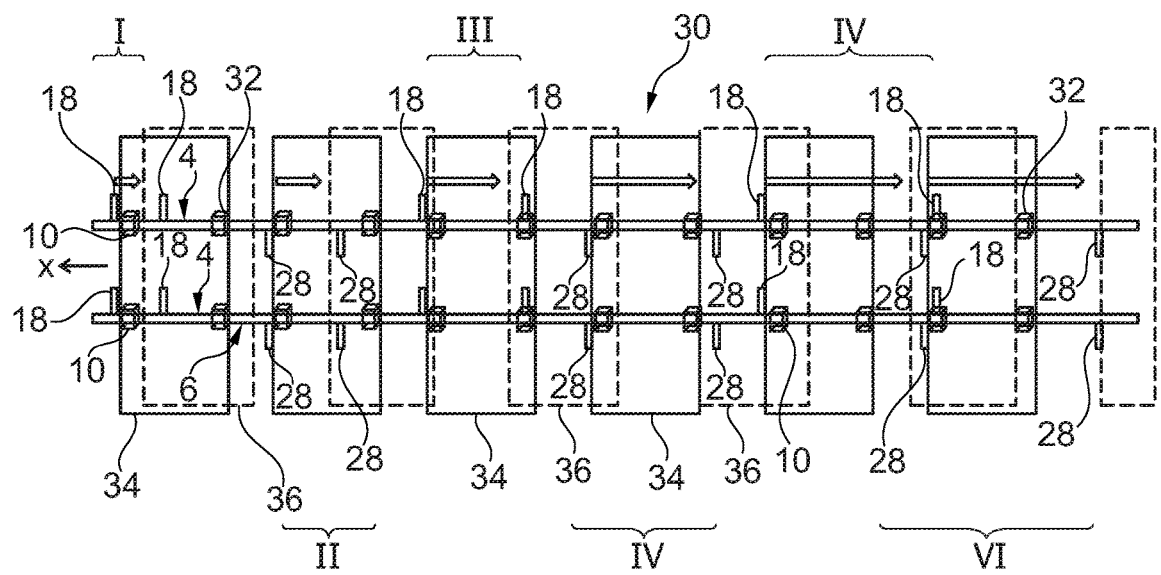
FIG. 2 shows a seat arrangement according to the invention in a schematic top view.

The design of a seat arrangement 30 is shown in FIG. 2. The flight direction runs in the drawing plane to the left. The holding blocks 18 on first side faces 4 and second holding blocks 28 on second side faces 6 are shown, which alternate in a pairwise manner each. Between first or second holding blocks, respectively, a first holding device 10 is present, and further distanced against the longitudinal direction a second holding device 32 is present, which is independent from the holding blocks 18 or 28, respectively. A closed rectangle indicates a passenger seat or a passenger seat row 34, respectively, which is present in a first position, which is determined through the depicted first holding devices 10. Additionally, directly adjacent thereto, a dashed rectangle is shown, which stands for a passenger seat or a passenger seat row 36 in a second position, which is determined through displacing the respective first holding device 10 against the longitudinal direction.

The distance of a first group of holding blocks 18 (I) stands for a seat distance widening a. The distance of holding blocks 28 of a second group (II) stands for the double widening distance 2a already. The distance of the holding blocks 18 of a third group (III) stands for the triple widening distance 3a and so forth.

A forward seat row may consequently be displaced along the distance a; for this a relatively short displacement distance is defined through the first holding blocks 18. The stop block 22 either contacts the forward first holding block 18 or the rear first holding block 18.

A passenger seat 34 directly behind it has to be displaced about the widening distance a already, just in order to assume the original seat distance. Consequently, for enlarging its seat distance, the widening distance a has to be added once again. The displacement distance is consequently defined through both second holding blocks 28 in such a manner, that a double widening distance is realizable. This scheme continues along the whole seat arrangement 2.

Here it is clearly shown that with the seat arrangement 30 according to the invention, a particular great flexibility regarding the positionability of the passenger seats 34 is given, as the groups of holding blocks 18 or 28, respectively, may realize relatively large displacement distances, since these are independent from the size of a seat frame and may also comprise clearly overlapping longitudinal regions (see in particular overlapping between the groups V and VI).

Second holding devices 32 may skip each position of holding blocks 28 or 18, respectively, without further ado; the same applies for the first holding devices 10 of passenger seats 34 that are directly one behind each other.

For an additional adaption to the available displacement distances, the length of the respective stop blocks 22 may be adapted. In the example shown in FIG. 2, a seat distance widening of three inches may be conducted in each case, which leads to a maximum displacement distance of 18 inch with the use of six passenger seat rows altogether. Such a displacement distance is not conductable with holding blocks underneath a seat frame, as the space available there is lower.

Figure 3:
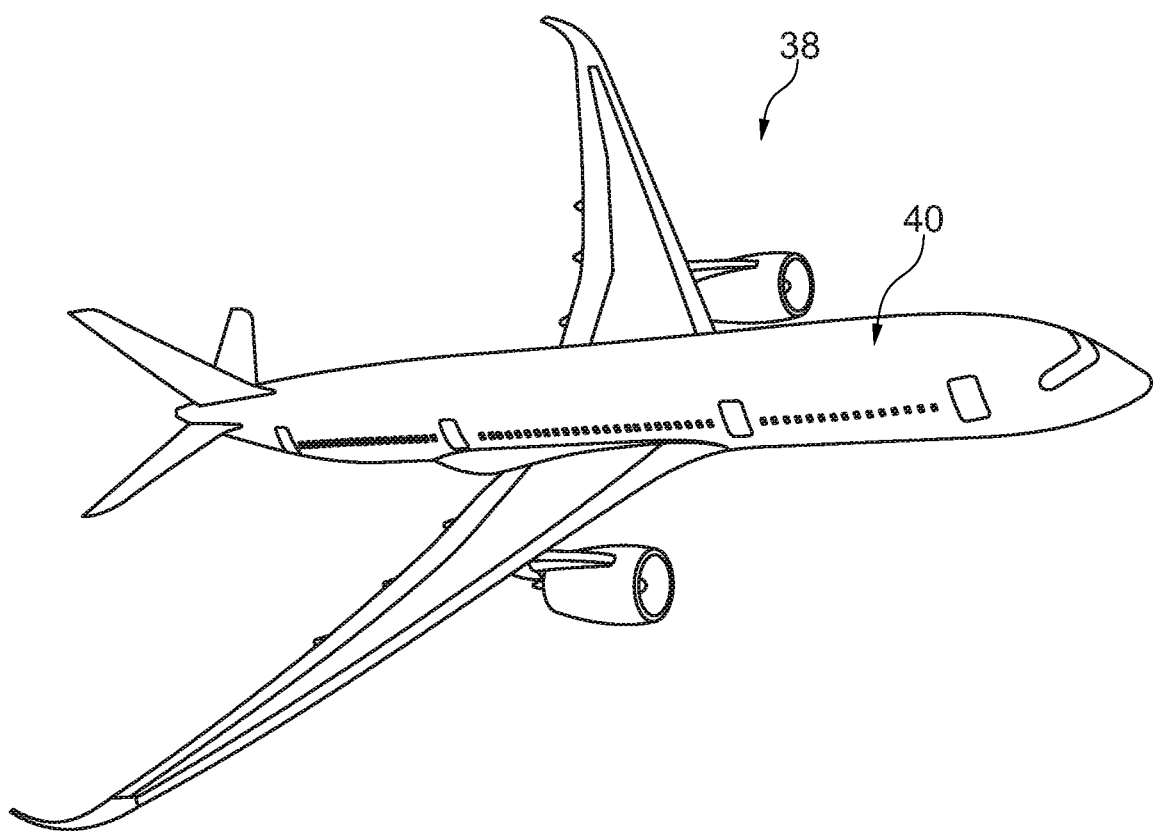
FIG. 3 shows an aircraft having a cabin installed therein having such a seat arrangement.

Finally, FIG. 3 exemplarily shows an aircraft 38, which comprises a cabin 40, in which at least one such passenger seat arrangement 30 is positioned.

In addition, it should be pointed out that "comprising" does not exclude other elements or steps, and "a" or "an" does not exclude a plural number. Furthermore, it should be pointed out that characteristics or steps which have been described with reference to one of the above exemplary embodiments may also be used in combination with other characteristics or steps of other exemplary embodiments described above. Reference characters in the claims are not to be interpreted as limitations.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A seat arrangement for a cabin of a vehicle, comprising:
   at least one seat rail having a top exterior side, a first exterior side face bordering the top exterior side on a first side thereof and a second exterior side face bordering the top exterior side on a second side thereof;
   at least one group of passenger seats held on the at least one seat rail by a plurality of holding devices, that at least rest on the top exterior side of the at least one seat rail;
   at least one pair of first holding blocks extending from the first exterior side face of the at least one seat rail;
   at least one pair of second holding blocks extending from the second exterior side face of the at least one seat rail; and
   a stop block arranged on a bottom side of each of the plurality of holding devices,
   wherein, for each passenger seat of the group of passenger seats, an associated holding device of the plurality of holding devices is displaceable either between the at least one pair of adjacent first holding blocks or between the at least one pair of adjacent second holding blocks,
   wherein the stop block of at least one of the plurality of holding devices is bringable into contact with one first holding block of the at least one pair of first holding blocks such that the stop block is movable in a space defined between the at least one pair of first holding blocks such that a further displacement of the stop block beyond one of the at least one pair of the first holding blocks in a displacement direction is prevented, or wherein the stop block of at least one of the plurality of holding devices is bringable into contact with one second holding block of the at least one pair of second holding blocks such that the stop block is movable in a space defined between the at least one pair of second holding blocks such that a further displacement of the stop block beyond one of the at least one pair of the second holding blocks in a displacement direction is prevented, and
   wherein a first one and an adjacent second one of the group of passenger seats along a direction of extension of the at least seat rail are alternatingly associated with the at least one pairs of first and second holding blocks, respectively.

2. The seat arrangement according to claim 1, wherein the at least one seat rail is a glide rail.

3. The seat arrangement according to claim 1, wherein the distances between the first or second holding blocks, respectively, associated with a string of passenger seats of the group of passenger seats along the extension direction of the at least one seat rail are in each case successively greater as a multiple of a seat widening distance.

4. The seat arrangement according to claim 1, wherein the at least one seat rail comprises engagement devices for receiving the first and second holding blocks extending from the first side face and the second side face, respectively.

5. The seat arrangement according to claim 1, wherein the holding blocks are connected to the first and second side faces through a material connection.

6. The seat arrangement according to claim 1, wherein at least one first holding device is associated with one of the group of passenger seats, wherein the at least one first holding device is arranged at a forward seat leg of a seat frame of the one passenger seat and comprises an arresting device for arresting the seat frame on the at least one seat rail.

7. The seat arrangement according to claim 6, wherein at least one second holding device is associated with the one of the group of passenger seats, wherein the at least one second holding device is arranged at a rear seat leg of the seat frame.

8. The seat arrangement according to claim 1, wherein the maximum distance between two holding blocks of the at least one pair of holding blocks associated with one of the group of passenger seats exceeds a seat distance between two adjacent passenger seats along the extension direction of the at least one seat rail.

9. The seat arrangement according to claim 1, wherein a length of the stop block is smaller than a length of the respective holding device.

10. The seat arrangement according to claim 1, wherein the at least one group consists of twenty four passenger seats or passenger seat rows at a maximum.

11. The seat arrangement according to claim 1, wherein the at least one group consists of six passenger seats or passenger seat rows at a maximum.

12. The seat arrangement according to claim 1, wherein the group of passenger seats comprises at least one compactable passenger seat or a compactable passenger seat row.

13. The seat arrangement according to claim 12, wherein the compactable passenger seat or the compactable passenger seat row comprises a seat component, which is foldable up.

14. A vehicle, comprising a cabin having at least one seat arrangement according to claim 1 integrated therein.

15. The vehicle according to claim 14, wherein the vehicle is an aircraft.

\* \* \* \* \*